March 12, 1929.    T. F. CULLINAN    1,704,884
TRUCK
Filed June 4, 1925
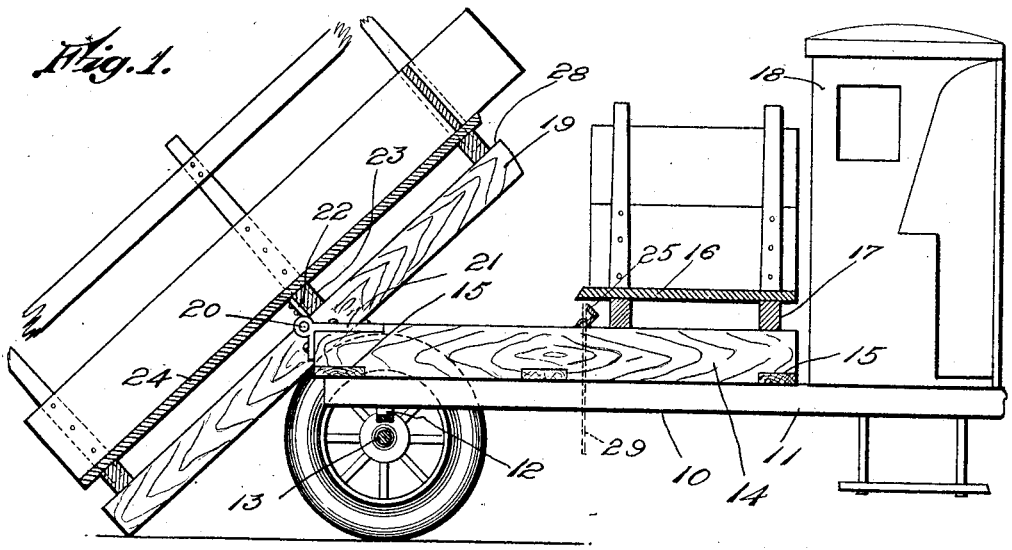
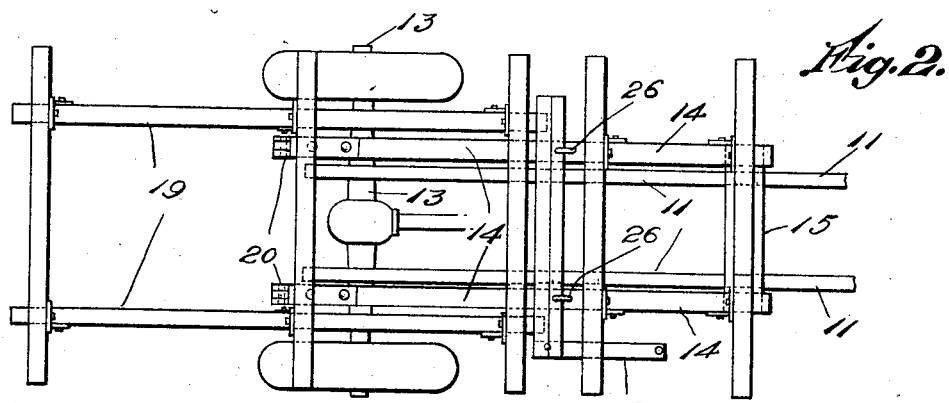
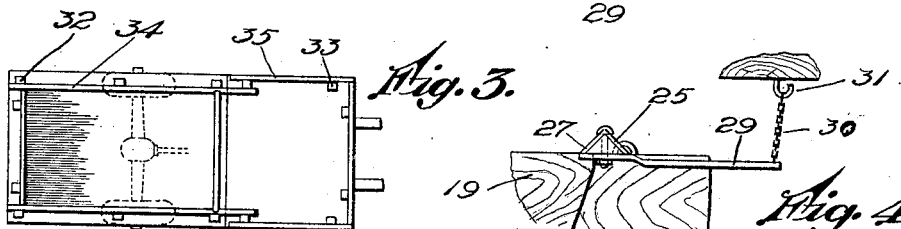
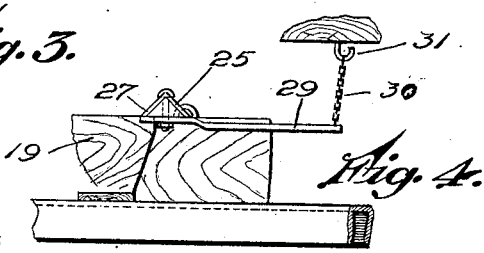
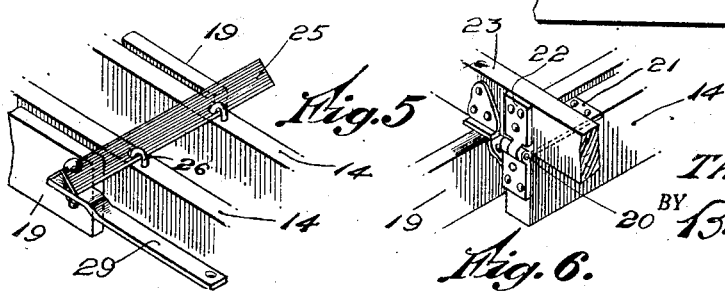
INVENTOR.
Thomas F. Cullinan.
BY Barlow + Barlow
ATTORNEYS.

Patented Mar. 12, 1929.

1,704,884

UNITED STATES PATENT OFFICE.

THOMAS F. CULLINAN, OF PROVIDENCE, RHODE ISLAND.

TRUCK.

Application filed June 4, 1925. Serial No. 34,976.

This invention relates to an improved construction of a combination truck having fixed and dumping sections; and has for its object to provide in such a truck a body portion which may be of the platform type having a fixed section and a dumping section pivotally mounted on the fixed section whereby the truck may be used for carrying long articles such as lumber or the like or it may be readily employed as a dumping truck for carrying such loads as stone, gravel, sand, coal and such material which it is desired to discharge by a dumping operation.

A further object of this invention is to mount the dumping section on a separate set of sills and to hinge these sills of the dumping section to swing on the sills of the fixed section and to provide simple and effective locking means for securing the dumping section in position on the fixed section of the truck.

With these and other objects in view, the invention consists of certain novel features of construction, as will be more fully described, and particularly pointed out in the appended claims.

In the accompanying drawings:

Figure 1 is a side elevation of my improved truck sectioned through the body portion thereof.

Figure 2 is a top view showing an arrangement of the sills and bolsters of both the dumping section and the fixed section of the truck.

Figure 3 is a top view illustrating the arrangement of the stakes and side boards of the fixed and dumping sections whereby the side boards of one overlap those of the other.

Figure 4 is a detail illustrating the lock bar which is mounted on the sills to lock those of the dumping section to those of the fixed section when in working position.

Figure 5 is a perspective view illustrating this locking cross-bar and its operating handle.

Figure 6 is a perspective view illustrating the hinge by which the dumping section is pivoted to the fixed section of the truck.

It is found in the practical operation of trucks of this character, of advantage to provide an inexpensive arrangement of a combination truck which may be employed either as a long platform truck or as a dumping truck for carrying widely varying loads of different characters such as lumber or other long articles when the whole length of the body is used, or for carrying sand, gravel, coal or similar material when only the dumping portion of the body is used, and to so arrange the after portion of the truck that when employed as a dumping truck this after portion is so balanced that its load may be tilted or tipped to dump and so discharge the load carried therein and by this construction the use of both types of trucks is combined in but a single body; and the following is a detailed description of the present embodiment of my invention and showing one construction by which these advantageous results may be accomplished:—

With reference to the drawings, 10 designates the fixed section of the truck, which is herein shown as being provided with metal chassis sills 11 supported at its rear end through the spring 12 on the rear axle 13 of the truck, and on this chassis sill is shown as being supported the wooden sills 14 on the cross bars 15. The forward or fixed portion 16 of the body is mounted on the bolsters 17 on these sills 14 just back of the cab 18, the showing of the usual motor end of the truck being omitted.

Straddling these fixed sills 14 are the sills 19 of the dumping section which are pivoted intermediate their ends at a point 20 through the brackets 21 to the ends of the fixed sills 14 through the hinge-plates 22, which hinge-plates are connected to one of the bolsters 23 on which bolsters the floor 24 of this dumping section is mounted. In order to lock the forward ends of the dumping sills 19 to the fixed sills 14 when the dumping section is swung back to its working position, I have provided a locking cross bar 25, preferably angular in cross section, which is hinged at 26 to the fixed sills, the rear edge 27 of this bar being arranged to overlap the forward ends 28 of the dumping sills, and an operating handle 29 is secured to this bar to extend forwardly a short distance and its free end is provided with a chain 30 adapted to engage the hook 31 whereby this lock bar may be swung into engaged position over the forward ends of these sills 19, and secured by this chain 30 to lock the dumping section in working position and when this chain is released the weight of the handle 29 serves to swing the lock bar up into disengaging position as illustrated in Figure 1 to release the dumping section to be tilted to discharge the load therein.

It is found in practice of advantage to mount the body stakes 32 and 33 of the different sections in alignment with each other and to position the side boards 34 of the dumping body on the inside of the stakes and the side boards 35 of the fixed body on the outside of the stakes whereby those of the dumping section will extend forward to fit inside of those of the fixed section to overlap and so close the openings between the two sections to make the body tight to prevent escape of small material which may be loaded therein.

My improved combination platform and dumping body is very simple and practical in construction and effective in its operation and by its use loads of widely varying characters may be carried on the truck and also permit the truck to be employed either as a platform truck for carrying the longer materials or as a dumping truck for carrying the smaller materials which it is found of advantage to dump, to be quickly discharged therefrom.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A truck body comprising a chassis, a set of sills on said chassis, a fixed floor section on said sills, a dumping frame and floor section including a second set of sills, one set of sills normally nesting within the other set, bolsters secured to said second set of sills, and hinge means pivotally securing one of said bolsters to said first set of sills.

2. A truck body comprising a chassis, a set of sills on said chassis, a fixed floor section on said sills, a dumping frame and floor section including a second set of sills, one set of sills normally nesting within the other set, bolsters secured to said second set of sills, and hinge means pivotally securing one of said bolsters to said first set of sills, and a locking crossbar hinged to the first set of sills to engage the other set of sills and hold said dumping section in working position.

In testimony whereof I affix my signature.

THOMAS F. CULLINAN.